United States Patent [19]

Sutphen

[11] Patent Number: 5,038,819

[45] Date of Patent: Aug. 13, 1991

[54] MOVABLE AIR STAND FOR PNEUMATIC TOOLS

[76] Inventor: David C. Sutphen, 3025 Ayres Chapel Rd., Whitehall, Md. 21161

[21] Appl. No.: 583,484

[22] Filed: Sep. 17, 1990

[51] Int. Cl.[5] .......... F16L 3/00

[52] U.S. Cl. .......... 137/343; 137/883; 137/355.17; 248/125; 248/129

[58] Field of Search .......... 248/125, 129, 124, 122; 137/343, 883, 359, 355.16, 355.17, 234.6

[56] References Cited

U.S. PATENT DOCUMENTS

| | | | |
|---|---|---|---|
| 1,261,755 | 4/1918 | Beyle | 248/125 |
| 1,758,131 | 5/1930 | Stirdivant | 137/355.17 |
| 2,490,839 | 12/1949 | Shaffer et al. | 137/343 |
| 4,725,027 | 2/1988 | Bekanich | 248/129 |
| 4,728,065 | 3/1988 | Coote | 248/129 |
| 4,832,294 | 5/1989 | Eidem | 248/129 |
| 4,870,994 | 10/1989 | Raymond | 137/883 |
| 4,944,292 | 7/1990 | Gaeke et al. | 137/343 |

*Primary Examiner*—A. Michael Chambers
*Attorney, Agent, or Firm*—Leonard Bloom

[57] ABSTRACT

A movable air stand for pneumatic tools has a supporting base and a vertical column supported by the base. The column is a tube closed at both ends having fittings thereon whereby compressed air may be introduced into the column through an inlet fitting and may be connected to pneumatic tools through a plurality of outlet fittings. A plurality of hangers are provided on the column, each hanger having a hook thereon for supporting one or more pneumatic tools when the tools are not in use. The hangers are pivotally joined to the column and are braced for support. The hangers and braces may be vertically pivoted on the stand. A tray is movably mounted on the stand. A moisture release valve is disposed at the base of the column. The air stand is easily assembled and disassembled.

26 Claims, 8 Drawing Sheets

MOVABLE AIR STAND FOR PNEUMATIC TOOLS

FIELD OF THE INVENTION

The present invention relates to air stands for pneumatic tools and, in particular, to movable air stands for a plurality of pneumatic tools.

BACKGROUND OF THE INVENTION

In recent years, the use of pneumatic tools in the building and automotive industries has become commonplace. A serious problem is the number of hoses which may be encountered on a work site in which a plurality of pneumatic tools are being used. The hoses may or may not be connected to a tool and a source of compressed air but are stretched about the work site. The hoses often become intermingled, tangled and are a source of irritation. Also much productive labor time is wasted untangling the hoses and determining whether the proper tool is connected to the source of compressed air. Also, traditionally, each pneumatic tool was connected to its own compressor, so that as more tools were utilized on a particular site, more compressors were also needed. This created problems of space and of the capital expenditure required for the compressors. Also drawbacks with electrical and air pressure wastage are encountered by the provision of a plurality of compressors.

To solve these and other problems, devices have been disclosed that accumulate air from a single compressor and this distributes the air to the pneumatic tools. Examples of such devices are disclosed in U.S. Letters Pat. Nos. 2,490,839 issued to Shaffer et al., and 4,870,994 issued to Raymond. The hose stand of Shaffer et al. is not readily portable by a single person and it cannot be easily assembled and/or disassembled. Raymond discloses a portable air accumulator for pneumatic tools comprising an air tank which is mounted horizontally on a pair of short supporting legs. The air accumulator includes an air inlet fixture for connecting the tank to an air compressor and a plurality of outlet fixtures for connecting the tank to a plurality of pneumatic tools. Each outlet fixture comprises an adjustable valve, an air gauge and a connector. Raymond does not have wheel means but must be lifted for movement. All the outlets are in the same plane. No means are provided for support of the pneumatic tools and the associated hoses. Raymond also cannot be easily assembled and/or disassembled. Further, Raymond does not disclose a means for having non-pneumatic tools and accessories conveniently available for persons using the pneumatic tools.

Furthermore, such devices of which I am aware are devoid of appropriate means for supporting and carrying thereon pneumatic tools that are not in use.

Thus, it can be seen that there remains a need for a movable air stand for pneumatic tools that may be easily assembled and disassembled and may be easily moved about a job site wherein a plurality of pneumatic tools are employed. It can further be seen that there remains a need for such a stand that also supports and carries thereon the pneumatic tools that are not in use and provides a means for having available non-pneumatic tools and accessories.

SUMMARY OF THE INVENTION

It is a primary object of the present invention to provide a portable air stand for pneumatic tools that may be easily moved about a job site, wherein a plurality of pneumatic tools are employed.

It is another primary object of the present invention to provide such a portable air stand that is also capable of supporting and carrying thereon pneumatic tools that are not in use.

It is a further object of the present invention to provide a portable air stand which is easily assembled and disassembled.

It is still another object of the present invention to provide such a portable air stand that also incorporates therein particular safeguards that reduce the possibility of damage occurring to the air stand while in use and/or being moved.

It is a still further object of the present invention to provide such a portable air stand that is simple and inexpensive to own and use.

In accordance with the teachings of the present invention, a movable air stand for pneumatic tools is disclosed that may be easily moved about a job site, wherein a plurality of pneumatic tools are employed. This air stand includes a supporting base with wheels. A vertical column is supported on the base and extending thereabove, the column includes a tube closed at both ends. An inlet air fitting is disposed on the the tube. In this manner, the tube may be connected to a source of compressed air. A plurality of air outlet fittings are disposed on the tube. In this fashion, the plurality of pneumatic tools may be easily and conveniently connected to the respective plurality of air outlet fittings, selectively, to the source of compressed air. Finally, means is provided on the stand for supporting one or more of the pneumatic tools when the tools are not in use.

In further accordance with the teachings of the present invention, the means of the stand for supporting one or more of the pneumatic tools that are not in use is disclosed. This means includes a respective hanger for each of the pneumatic tools. Each hanger has respective first and second opposite ends. The respective first ends of the hangers are pivotally joined to the tube for pivotal movement of the hanger about the first end thereof in a vertical plane. The respective second opposite ends of the hangers include a hook formed thereon for receiving and supporting one of the respective pneumatic tools that are not in use. A respective brace is secured between the tube and each respective hanger. Each brace has respective first and second opposite ends. The first end of each brace is pivotally secured to the tube for pivoted movement of the brace about the first end thereof in a vertical plane. The second opposite end of each brace is pivotally secured to the respective hangers between the first and second opposite ends of said respective hangers for concomitant pivoted movement of the brace and the hanger in a vertical plane. The tube of the vertical column further includes a respective vertical guideway for each of the respective hangers for receiving therein the respective first ends of the braces. In this manner, the first ends of the braces may be vertically moved along the tube for permitting vertical pivoting of the respective braces and hangers.

In still further accordance with the teachings of the present invention, there is disclosed additional means on the stand for supporting one or more of the pneumatic tools when the tools are not in use. This means includes a respective hanger for each of the pneumatic tools. Each hanger has a center member. The center member has a pair of opposite sides and a center opening through the center member, the opening being substantially parallel to the sides thereof. A rod extends outwardly from each side of the center member. A plurality of spaced-apart threaded means are connected to the tube, each threaded means extending outwardly from the tube. The center opening of each respective center member may receive a respective threaded means therein such that the respective hanger may pivot about the respective threaded means. A plurality of threaded fasteners cooperate with the respective threaded means such that the respective fastener may secure the respective hanger with the respective rods transverse with respect to the tube and in a vertical plane with respect to the tube.

In another aspect of the present invention, in addition to the pivotability of the means for supporting the pneumatic tools, the stand includes female fittings that are disposed, so as to be substantially parallel to the tube. In each of these respects, safeguards are provided that reduce the possibility of damage occurring to the air stand.

These and further objects and advantages of the present invention will become readily apparent from a reading of the following description, taken in conjunction with the enclosed drawings.

DESCRIPTION OF PREFERRED EMBODIMENTS

Figure 1:
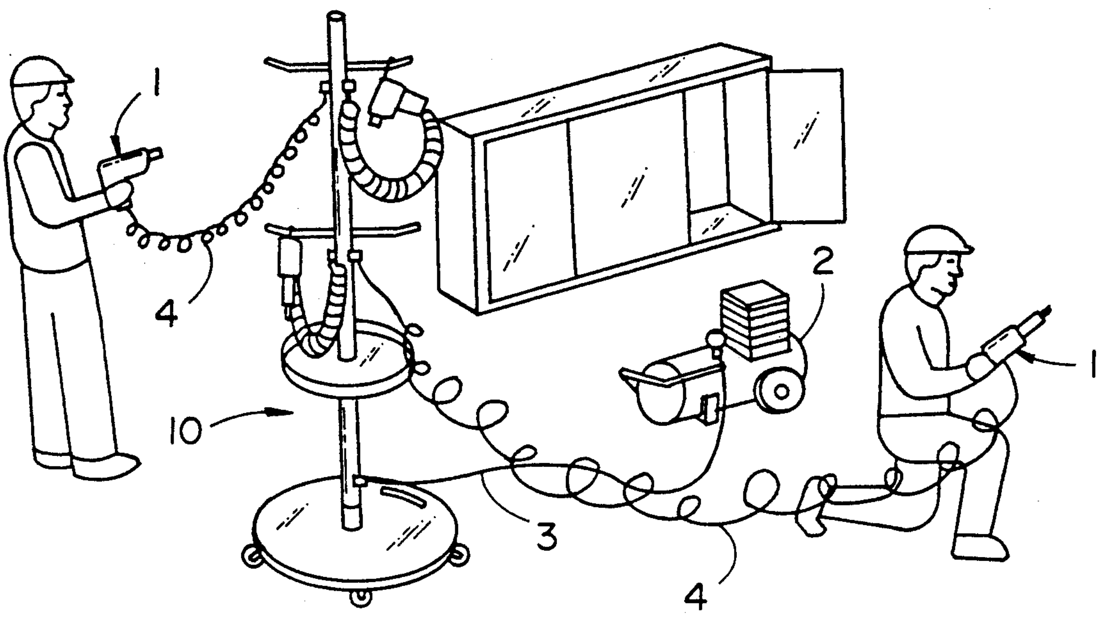
FIG. 1 is a pictorial view of the portable air stand of the present invention on the job site with two workers using respective pneumatic tools that are connected to the device and with two other pneumatic tools being supported and carried by the stand.

Referring now to the drawings, the movable, portable air stand 10 includes a supporting base 11, a vertical column 12, an air inlet fitting 13, a plurality of air outlet fittings 14 and pneumatic tool support means 15.

The supporting base 11 includes a support plate 16. The support plate 16 may be fabricated from any suitable material into any suitable shape. However, in the context of the present invention, it is preferred that the plate 16 be fabricated from a heavy-duty light-weight material, such as a plastic or a metal alloy in a circular shape. Such a feature not only reduces the cost of the stand 10 but also makes it more lightweight, thereby facilitating its movability/transportability.

It is further preferred that the plate 16 be 26" in diameter, so as to fit through most standard 30" wide doors.

Figure 2:
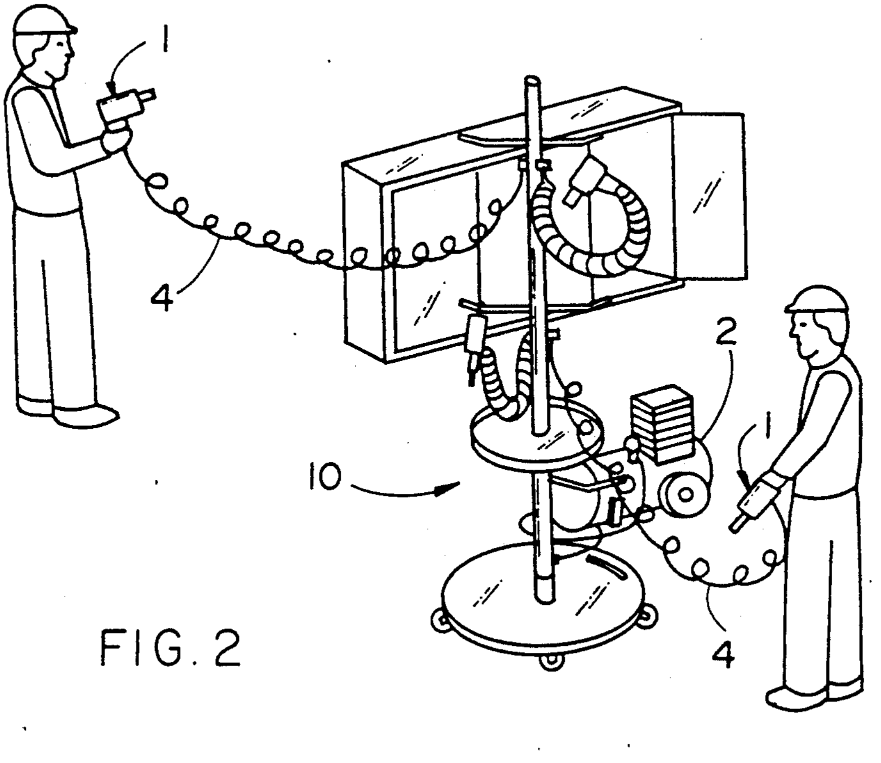
FIG. 2 is another pictorial view of the portable air stand of the present invention on the job site wherein a worker has transported or carried the air stand from one place on the job site to another.
Figure 3:
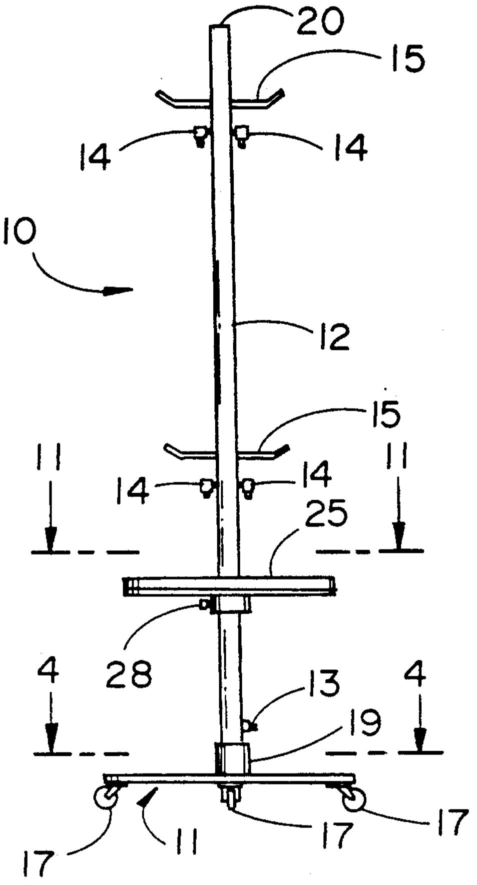
FIG. 3 is a front elevation view of the air stand of the present invention.
Figure 4:
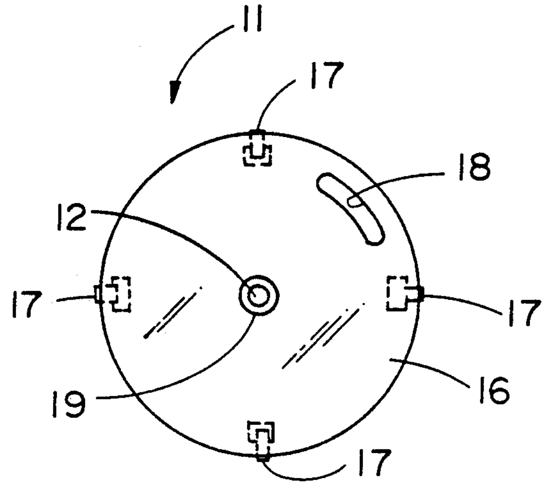
FIG. 4 is a cross-section view taken along lines 4—4 of FIG. 3.

The supporting base 11 is provided with wheels or casters 17. These wheels 17 permit the stand to be easily moved about a job site wherein a plurality of pneumatic tools 1 are employed (see FIGS. 1 and 2). Preferably, such wheels 17 are equidistantly spaced about the base 11, extending downwardly therefrom. (FIGS. 3 and 4).

Figure 5:
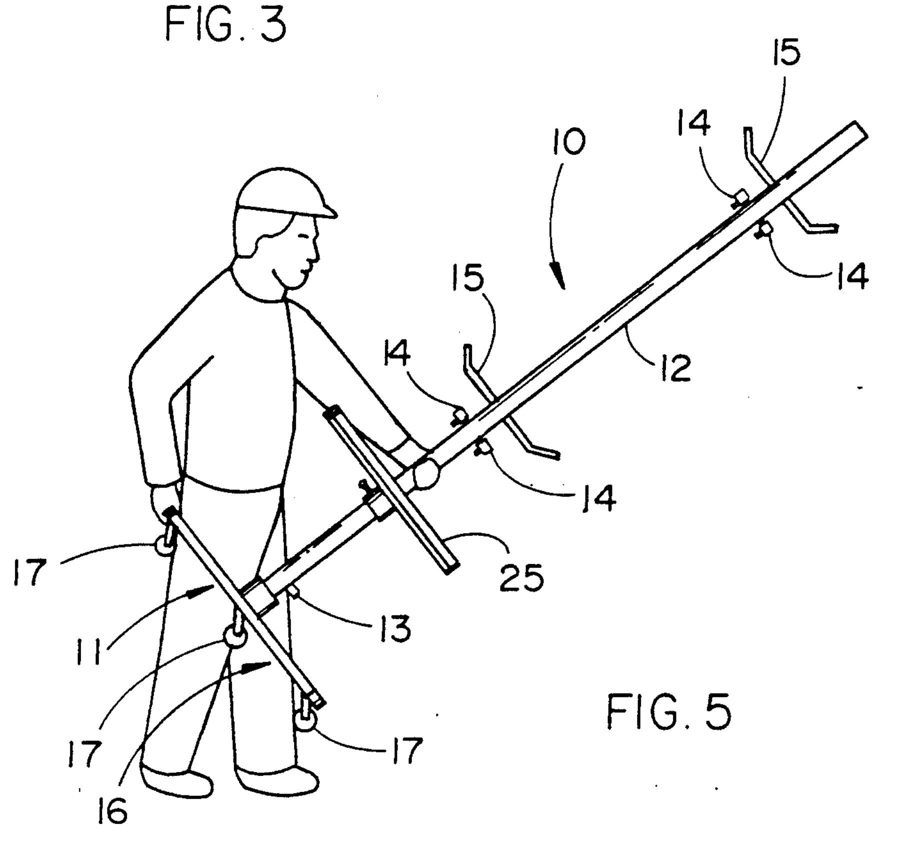
FIG. 5 is another pictorial view of the portable air stand of the present invention on the job site with a worker transporting the air stand from one place to another by carrying it.

It is further preferred that the plate 16 be formed having a handle opening 18 formed therein. Such an opening 18 may be used to grip and pick up the support base 11 with one hand while the other hand grips the column 12, for aiding in moving and/or transporting the stand (FIG. 5). Alternately, a handle may be disposed on the plate 16 for this purpose.

Finally, the base 11 further includes an upwardly-extending boss 19 (sleeve) that is centrally disposed on the plate 16. (See in particular FIGS. 3, 4, 6 and 7). Boss 19 is provided for receiving and removably securing the vertical column 12 therein. Preferably this boss 19 has an internal diameter of approximately 2 inches.

Figure 10:
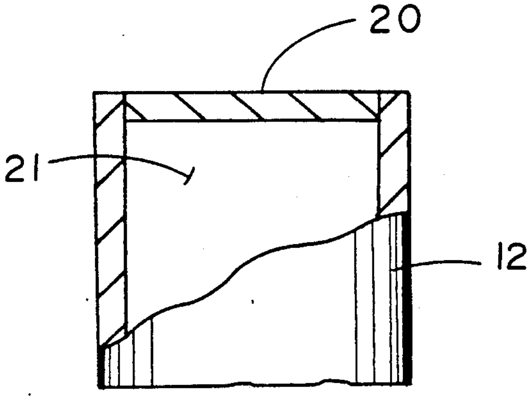
FIG. 10 is an enlarged view of the uppermost portion of the vertical column with parts thereof removed therefrom for the sake of clarity.
Figure 11:
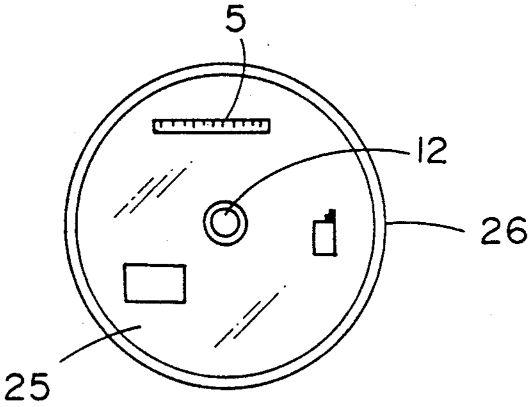
FIG. 11 is another cross-section view taken along lines 11—11 of FIG. 3.
Figure 12:
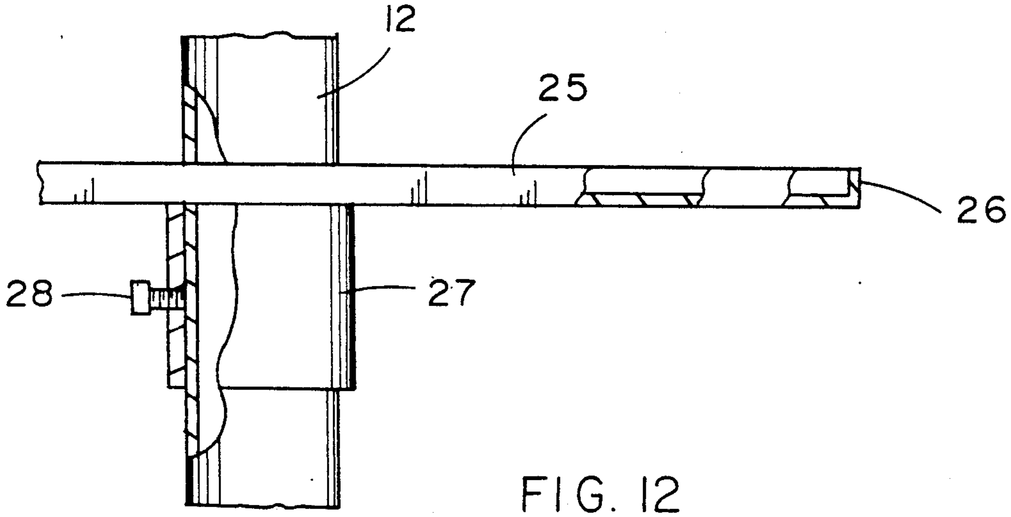
FIG. 12 is an enlarged view of the tray and the portion of the vertical column on which the tray is supported, with parts thereof broken away therefrom for the sake of clarity.
Figure 13:
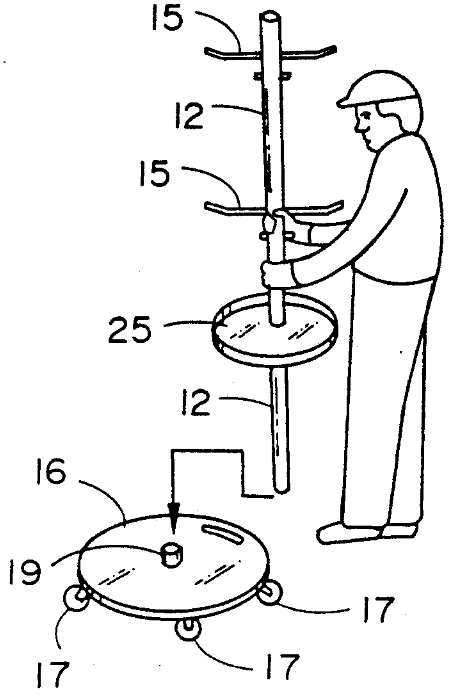
FIG. 13 is a pictorial view of the vertical column of the present invention being removed from the base.
Figure 15:
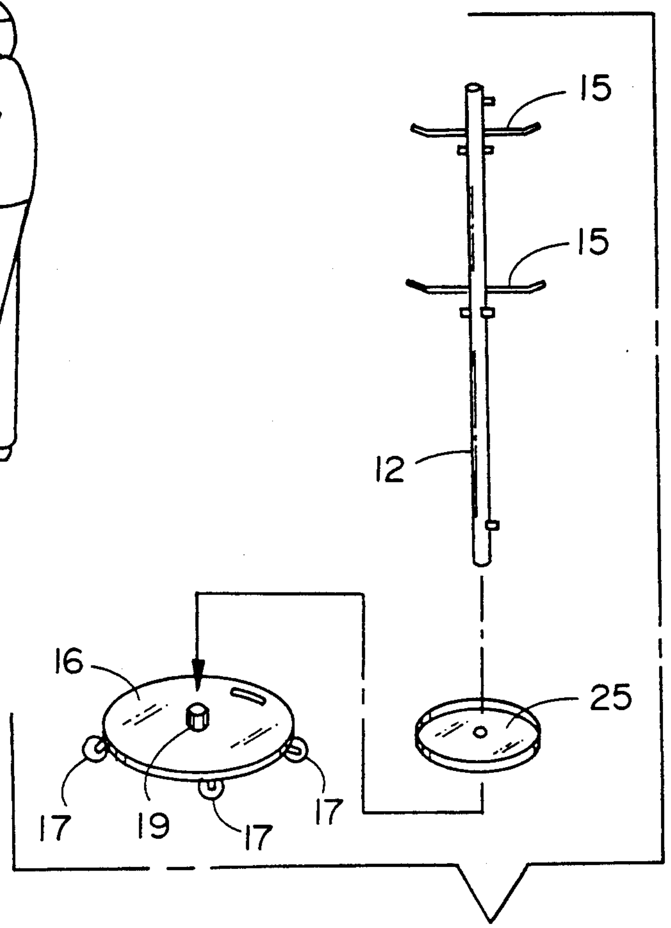
FIG. 15 is an exploded view of the portable air stand of the present invention showing the base, the tray and the vertical column.
Figure 14:
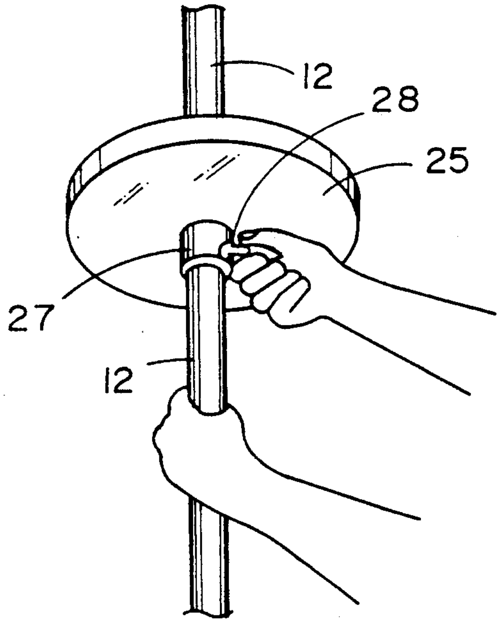
FIG. 14 is a pictorial view of the manual adjustment of the tray on the vertical stand.
Figure 16:
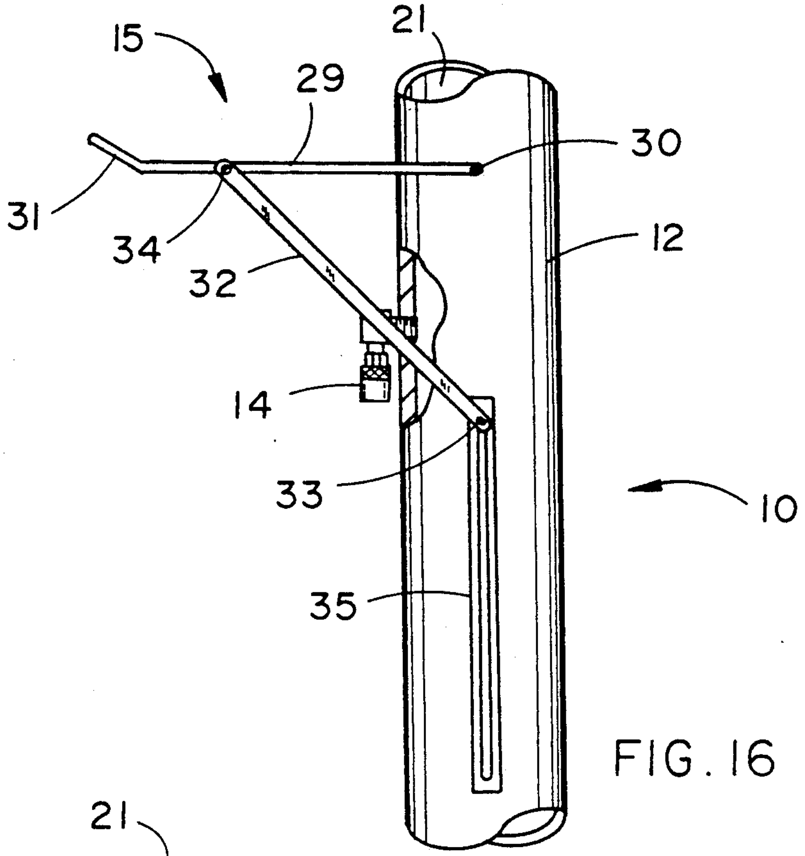
FIG. 16 is an enlarged view of the means on the stand for supporting one or more of the pneumatic tools when the tools are not in use.
Figure 17:
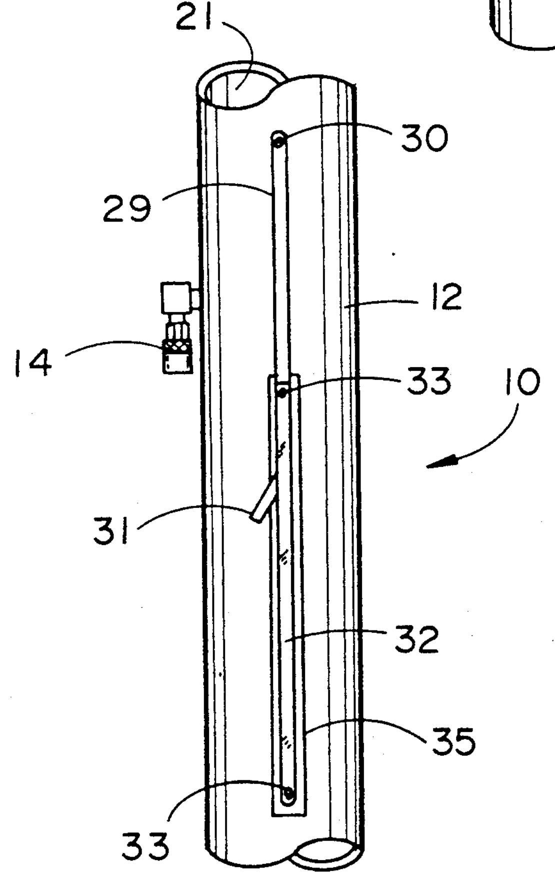
FIG. 17 is another view of the means seen in FIG. 16 wherein the hanger is pivoted into a position being substantially parallel to the column.

The vertical column 12 is supported by the boss 19 on the base 11, so as to extend thereabove. The column 12 comprises a tube or pipe that is closed at both ends. The upper end of the column is closed by a cap 20 that is pressed or welded over the top thereof, so as to form an air-tight seal therebetween (FIG. 10). The bottom end of the column is sealed by its contact with the base 11, as described above or by any suitable means. Preferably, this column 12 has an outer diameter of approximately 2 inches. The mobile air stand 10 may be easily moved by the user grasping the column 12 and pushing or pulling against the column 12.

Figure 6:
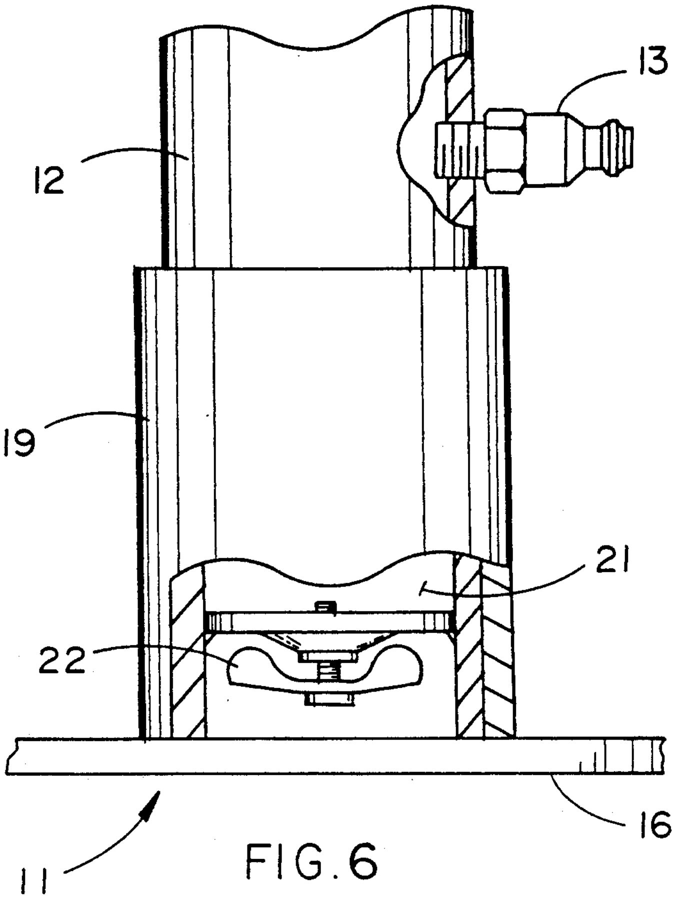
FIG. 6 is an enlarged view of a portion of the vertical column and the supporting base of the portable air stand of the present invention with a portion of the column broken away therefrom to reveal the water release valve.
Figure 7:
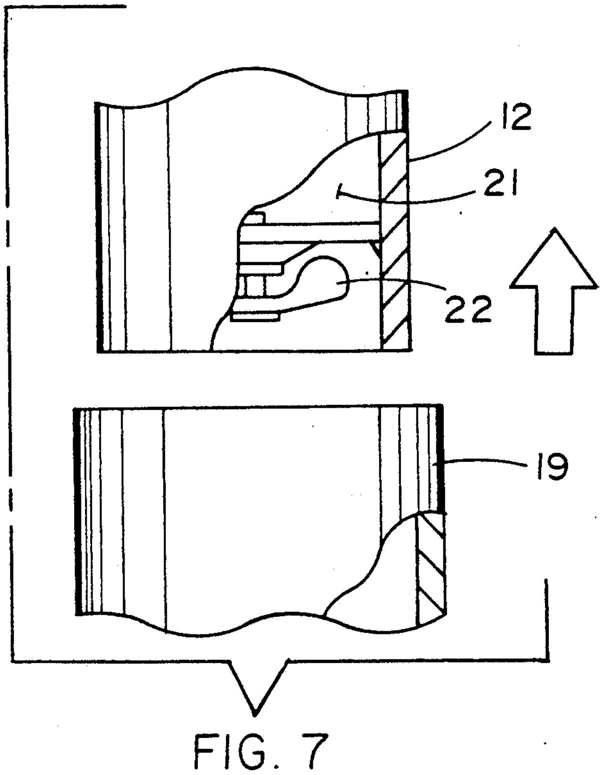
FIG. 7 is another view corresponding to FIG. 6 but wherein the tube of the vertical column is removed therefrom for the sake of clarity.

Carried inside the air passage 21 of the column 12 at the bottom end thereof (between the base 11 and the air inlet filling) is a moisture (water) release valve 22 (FIG. 6). The valve 22 is provided to release from the stand 10 the moisture that will accumulate inside the air passage 21 formed in the column 12 by virtue of the pressurized airflow therethrough. Preferably, the release valve 22 is recessed, so as not to be damaged during use of the stand 10.

With particular reference now to FIGS. 3 and 6, an air inlet is formed in the vertical column 12 near the supporting base 11, so as to be in gaseous communication with the air passage 21. This air inlet is fitted with an air inlet fitting 13 that is carried on the tube 12 near the supporting base 11. In this fashion, the passageway 21 in the tube 12 may be connected to a source 2 of compressed air (such as an air compressor) by suitable means such as air lines 3.

Preferably, the air inlet fitting 13 is a ¼ inch male fitting that is located near the supporting base 11 of the stand 10.

Figure 8:
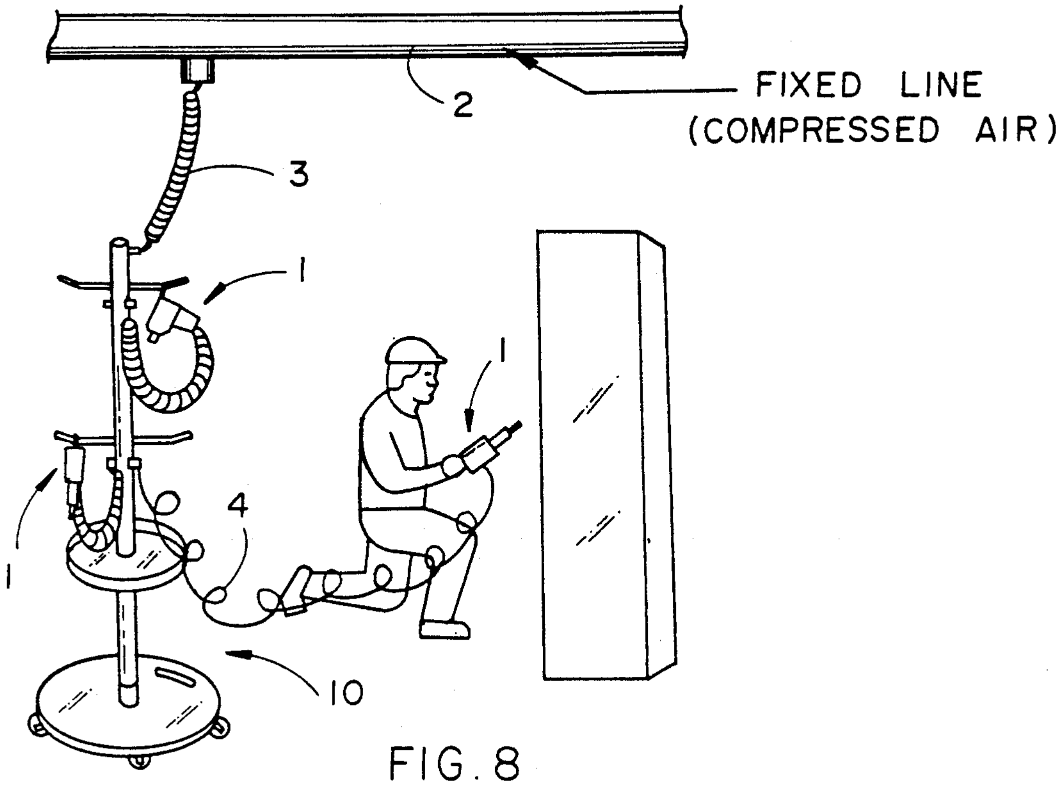
FIG. 8 is a pictorial view of the portable air stand of the present invention on a job site showing the stand connected to a fixed line of compressed air.
Figure 9:
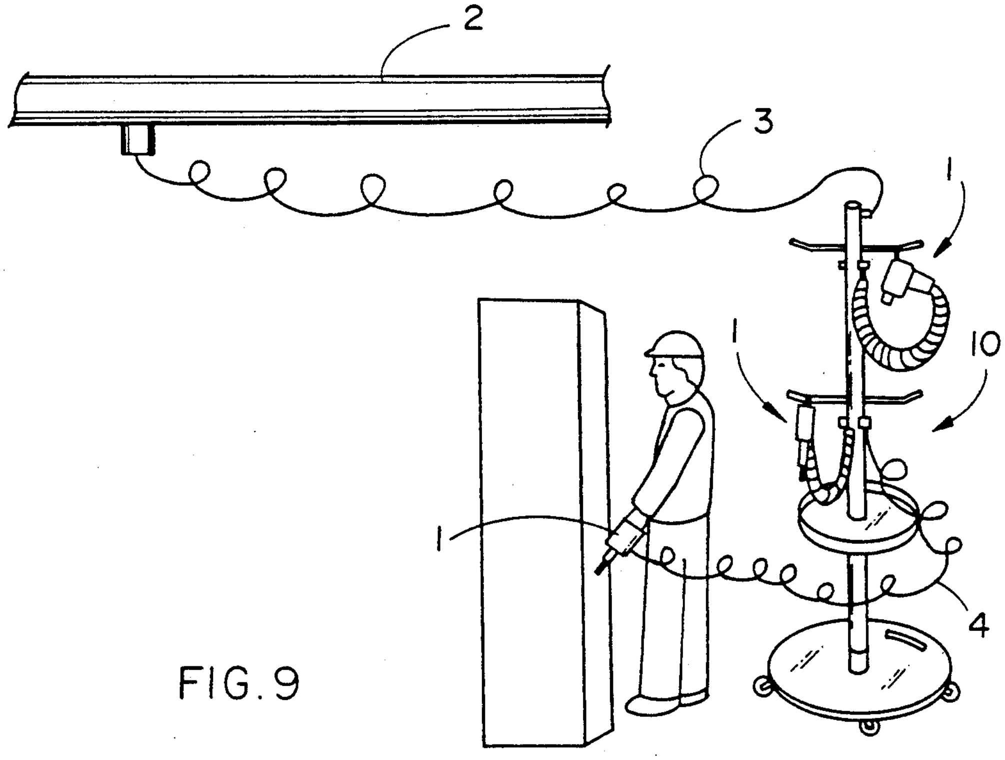
FIG. 9 is another pictorial view of FIG. 8 showing the portable air stand of the present invention moved to a different location on the job site.

Referring to FIGS. 8 and 9, the air inlet may also formed in the vertical column 12 near the top of the column 12 so as to be in gaseous communication with the air passage 21. This air inlet is fitted with an air inlet fitting 13. In this fashion, the passageway 21 in the tube 12 may be connected, via a suitable means such as in line 3, to a source 2 of compressed air such as a fixed line in a permanent installation. In this manner the compressor may be at a remote location and the persons using the pneumatic tools may work in an environment with a significantly reduced noise level.

With particular reference now to FIGS. 3, 5, 16 and 17, a plurality of air outlets are also formed in the vertical column 12 near the top of the stand 10, so as to be in gaseous communication with the air passage 21. These air outlets are fitted with respective air outlet fittings 14 that are carried on the tube near the top of the stand 10. In this fashion, the passage 21 in the tube may be connected to respective pneumatic tools 1 (such as pneumatic nailers) by suitable means, such as air lines 4.

Preferably, the air outlet fittings 14 are ¼ inch female quick-disconnect outlet fittings. It is also preferred that these air outlet fittings 14 be disposed, so as to be diametrically opposite of each other on the tube 12. Finally, it is further preferred that these air outlet fittings 14 be disposed substantially parallel to the tube 12, such that the fittings 14 are protected during transportation of the stand 12.

In the above manner, the plurality of pneumatic tools 1 may be easily and conveniently connected to the respective plurality of air outlet fittings 14, selectively, to the source 2 of compressed air.

With particular references now to FIGS. 3 and 11–15, carried by the vertical column above the air inlet fitting 13 is a movable tray 25. Tray 25 circumferentially surrounds the tube 12 and is mounted on the tube 12 intermediately thereof, such that persons on all sides of the stand have access to the tray 25, so that the tool accessories 5, personal items or the like may be placed on the tray 25. It is further preferred that this tray 25 include a peripheral rim 26.

Preferably, the tray 25 is movably mounted on the tube 12 intermediately thereof, such that the vertical positioning of the tray 25 along the tube 12 may be adjusted as desired. This vertical adjustability is preferably provided by the tray 25 including an aperture that is formed therein for removably receiving the tube 12, and a downwardly extending adjustment collar (sleeve) 27 that is carried by the underside of the tray 25 and which is disposed circumferentially about the tube 12. A horizontal set screw 28 is provided, being carried by the collar 27, for selectively adjusting the positioning of the vertical height of the tray 25 along the column 12 and for selectively securing the tray 25 in the selected vertical position. In this manner, the tray 25 may be adjusted to a desired height so that persons working at an elevated height above the surface of the work site (such as standing on a ladder) and persons standing on the ground may have access to the tray 25 and to air outlet fittings 14 at various heights on the tube 12.

A further feature and advantage of the present invention is that it may be easily and rapidly assembled and disassembled. The vertical column 12 is removably disposed in the boss 19 on the plate 16 of the base 11. The tray 25 is removably mounted on the tube 12 by adjustment of the collar 27 by the set screw 28. Thus, the stand may be easily transported form one work site to another and may be assembled or disassembled with a minimum of effort in a very short period of time.

With reference now to FIGS. 16–20, the means 15 on the stand 10 for supporting one or more of the pneumatic tools 1 when they are not in use, is illustrated. This means includes a plurality of hooks that are secured to the tube 12 extending transversely therefrom.

More particularly, (FIGS. 16 and 17) the preferred embodiment of the means 15 includes a respective hanger 29 for each of the tools 1. Each hanger 29 has respective first and second opposite ends. The respective first ends of the hangers 29 is pivotally joined to the tube at pivot point 30 for pivotal movement of the hanger 29 about the pivot point 30 of the first end thereof in a vertical plane. The respective second opposite ends of the hangers 29 include a hook 31 formed thereon for receiving and supporting at least one of the respective pneumatic tools 1 that are not in use.

Each means 15 further includes a respective brace 32 having respective first and second opposite ends. The first end of each brace 32 is pivotally secured to the tube 12 at pivot point 33 for pivotal movement of the brace 32 about the pivot point 33 and further permitting movement of the first end of the brace 32 in a vertical plane. The second opposite end of each brace 32 is pivotally secured to the respective hangers 29 at pivot point 34 being between the first and second opposite ends of the respective hangers 29. In this fashion the hangers 29 and the braces 32 will concomitantly pivot in a vertical plane relative to the tube 12.

Finally, each means 15 further includes respective vertical guideways 35 for each of the respective hangers 29. The first ends of each of the respective braces 32 is received in a respective guideway 35, such that the first ends (including the pivot points 33) may be vertically moved along the tube 12. In this fashion, the first ends (including the pivot points 34) of the braces 32 may be vertically moved along the tube 12 for permitting the vertical pivoting of the respective braces 32 and hangers 29.

Figure 18:
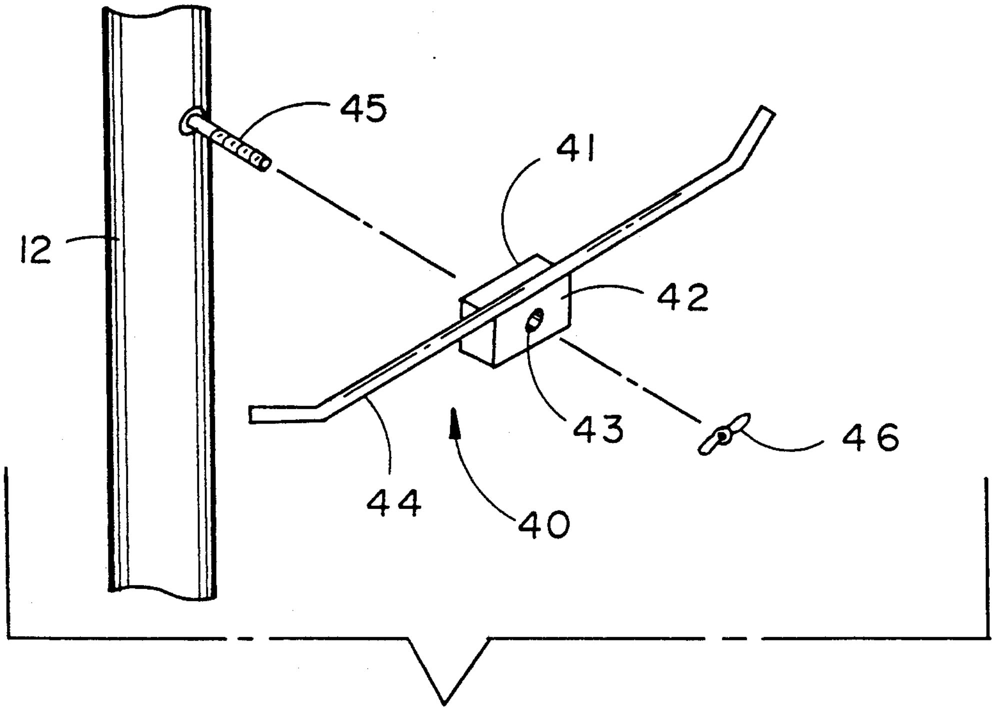
FIG. 18 is a perspective exploded view of another embodiment of the means on the stand for supporting one or more of the pneumatic tool.
Figure 19:
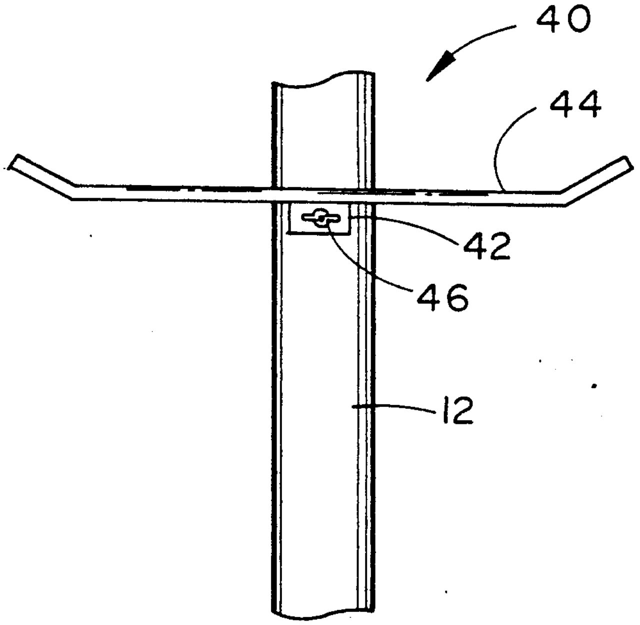
FIG. 19 is a side view of the means seen in FIG. 18 wherein the hanger is pivoted into a position transverse to the column.
Figure 20:
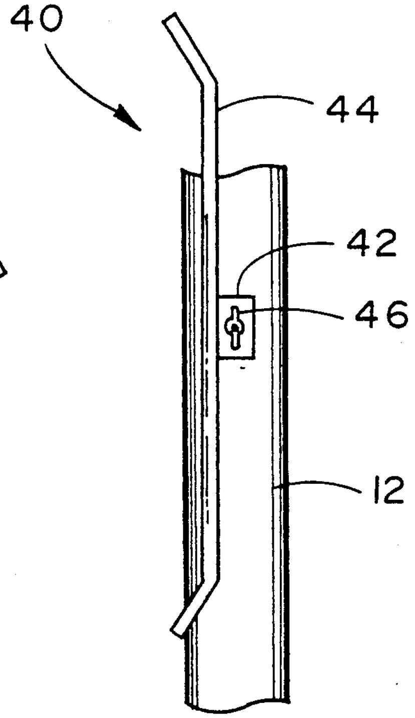
FIG. 20 is a side view of the means seen in FIG. 18 wherein the hanger is pivoted into a position being substantially parallel to the column.

In another preferred embodiment of the means 15 on the stand 10 for supporting one or more pneumatic tools 1, when not in use is a respective hanger 40 for each of the pneumatic tools 1 (FIGS. 18–20). Each hanger has a center member 41. Each center member 41 has a pair of opposite sides 42 and a center opening 43 through each center member 41. The center opening 43 is substantially parallel to the respective sides thereof. A rod 44 extends outwardly from each side of the center member 41. A plurality of spaced-apart threaded means 45 (e.g. carriage bolts) are connected to the tube 12. Each threaded means 45 extends outwardly from the tube 12 such that the center opening 43 of each respective center member 41 may receive a respective threaded means 45 therein. The respective hanger 40 may pivot about the respective threaded means 45. A plurality of threaded fasteners 46 (such as wing nuts) cooperate with the respective threaded means 45 such that the respective threaded fastener 46 may secure the respective hanger 40 with the respective rods 44 transverse with respect to the tube 12 and in a vertical plane with respect to the tube 12.

Figure 21:
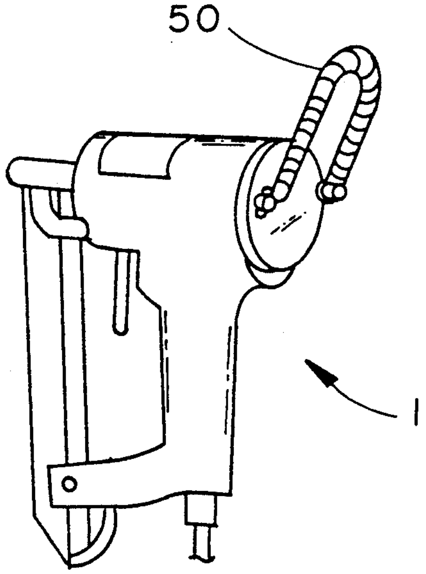
FIG. 21 is a perspective view of the pneumatic tool showing the loop attached thereto.

The pneumatic tool 1 has a loop 50 attached thereto (FIG. 21) such that the tool may be simply hung from the support means 15 on the air stand 10. This may be a coiled spring, a wire or any suitable means. The loop 50 may be easily attached to the pneumatic tool 1 by connecting the ends of the loop 50 preferably to screws which are existent on the body of the pneumatic tool 1. The loop 50 is flexibly mounted on the pneumatic tool 1 so that the loop 50 does not interfere with the use of the tool 1 and also so that the tool 1 may be hung from the support means 15 from any direction. The user may hold the tool 1 with one hand and the loop 50 is available for being engaged by the support means 15.

Thus, when the pneumatic tool 1 is not in use, it may be supported on a hook at a convenient height even if the worker is on a ladder or a scaffold elevated above the surface of the work site. Also, due to the disposition of the air outlet fittings 14 at several heights above the base 11, the worker may easily and conveniently connect the pneumatic tool 1 to the source of compressed air without having to climb up or down from a ladder or scaffold. Furthermore, even when the worker is standing at the surface of the work site, there is no need to bend down to connect the pneumatic tool 1 to the air outlet fitting 14 (such as with the air accumulator disclosed by Raymond). The worker has an air outfit fitting 14 at a convenient height and, in addition, has a support means 15 for the pneumatic tool also convenient to the air outlet fitting 14. Coupled with its mobility and ease of assembly, the present invention enables workers at a job site to perform their tasks more efficiently with less expenditure of energy and less waste of time. Furthermore, since the air stand of the present invention does not require the fabrication of specially designed components, the air stand can be made at low cost.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A disassembleable, movable air stand for pneumatic tools, comprising a supporting base provided with wheels, such that the stand may be easily moved about a job site wherein a plurality of pneumatic tools are employed, a vertical column removably supported on the base and extending thereabove, such that the stand may be easily and rapidly assembled and disassembled, the column comprising a tube having a top end and a bottom end, the tube being closed at both ends, an inlet air fitting on the tube such that the tube may be connected to a source of compressed air, a plurality of air outlet fittings on the tube, such that the plurality of pneumatic tools may be easily and conveniently connected to the respective plurality of air outlet fittings, selectively, to the source of compressed air, and means on the stand for supporting one or more of the pneumatic tools when the tools are not in use.

2. The movable air stand of claim 1, wherein the means on the stand for supporting one or more of the pneumatic tools when the tools are not in use, comprises a plurality of hooks secured to the tube and extending transversely therefrom.

3. A movable air stand for pneumatic tools, comprising a supporting base provided with wheels, such that the stand may be easily moved about a job site wherein a plurality of pneumatic tools are employed, a vertical column supported on the base and extending thereabove, the column comprising a tube having a top end and a bottom end, the tube being closed at both ends, an inlet air fitting on the tube such that the tube may be connected to a source of compressed air, a plurality of air outlet fittings on the tube, such that the plurality of pneumatic tools may be easily and conveniently connected to the respective plurality of air outlet fittings, selectively, to the source of compressed air, and means on the stand for supporting one or more of the pneumatic tools when the tools are not in use, wherein the means on the stand for supporting one or more of the pneumatic tools when the tools are not in use, comprises a respective hanger for each of the pneumatic tools, each hanger having respective first and second opposite ends, the respective first ends of the hangers being pivotally joined to the tube for pivotal movement of the hanger about the first end thereof in a vertical plane, the respective second opposite ends of the hangers including a hook formed thereon for receiving and supporting one of the respective pneumatic tools that are not in use, a respective brace secured between the tube and each respective hanger, each brace having respective first and second opposite ends, the first ends of each brace being pivotally secured to the tube for pivotal movement of the brace about the first end thereof in a vertical plane and the second opposite ends of each brace being pivotally secured to the respective hangers between the first and second opposite ends of said respective hangers for concomitant pivotal movement of the brace and the hanger in a vertical plane, and the tube of the vertical column further including a respective vertical guideway for each of the respective hangers for receiving therein the respective first ends of the braces, such that the first ends of the braces may be vertically moved along the tube for permitting vertical pivoting of the respective braces and hangers.

4. The movable air stand of claim 1, further including a tray circumferentially surrounding the tube and mounted on the tube intermediately thereof, such that persons on all sides of the stand have access to the tray, so that tool accessories, personal items or the like may be placed on the tray.

5. The movable air stand of claim 4, wherein the tray is movably mounted on the tube intermediately thereof, and further wherein the tray includes an aperture formed therein for removably receiving the tube, an adjustment collar carried by the tray so as to be circumferentially disposed about the tube and a horizontal set screw carried by the collar for selectively securing the tray in a selected vertical position, such that the vertical positioning along the tube may be adjusted as desired.

6. The movable air stand of claim 1, wherein the inlet air fitting comprises a male fitting located near the supporting base of the stand.

7. The movable air stand of claim 1, wherein the air inlet fitting comprises a male fitting located near the top end of the vertical column.

8. The movable air stand of claim 1, wherein the outlet air fittings comprise female fittings near the top of the stand.

9. The movable air stand of claim 8, wherein the female fittings are disposed so as to be substantially parallel to the tube, such that the fittings are protected during transportation of the stand.

10. A movable air stand for pneumatic tools, comprising a supporting base provided with wheels, such that the stand may be easily moved about a job site wherein a plurality of pneumatic tools are employed, a vertical column supported on the base and extending thereabove, the column comprising a tube having a top end and a bottom end, the tube being closed at both ends, an inlet air fitting on the tube such that the tube may be connected to a source of compressed air, a plurality of air outlet fittings on the tube, such that the plurality of pneumatic tools may be easily and conveniently connected to the respective plurality of air outlet fittings, selectively, to the source of compressed air, and means on the stand for supporting one or more of the pneumatic tools when the tools are not in use, further comprising a moisture release valve disposed in the vertical column between the inlet air fitting and the base, such that moisture in the tube may be released therefrom.

11. The movable air stand of claim 10, wherein the moisture release valve is recessed, so as not to be damaged.

12. A movable air stand for pneumatic tools, comprising a supporting base provided with wheels, such that the stand may be easily moved about a job site wherein a plurality of pneumatic tools are employed, a vertical column supported on the base and extending thereabove, the column comprising a tube having two ends, the tube being closed at both ends, a male inlet air fitting on the tube such that the tube may be connected to a source of compressed air, and a plurality of female air outlet fittings on the tube near the top of the stand, such that the plurality of pneumatic tools may be easily and conveniently connected to the respective plurality of air outlet fittings, selectively, to the source of compressed air, a plurality of hooks secured to the tube and extending transversely therefrom for supporting one or more of the pneumatic tools when the tools are not in use, and a tray circumferentially surrounding the tube and mounted on the tube intermediately thereof, such that persons on all sides of the stand have access to the tray, so that tool accessories, personal items or the like may be placed on the tray and further wherein the tray includes an aperture formed therein for removably receiving the tube, an adjustment collar carried by the tray so as to be circumferentially disposed about the tube and a horizontal set screw carried by the collar for selectively securing the tray in a selected vertical position, such that the vertical positioning along the tube may be adjusted as desired.

13. A movable air stand for pneumatic tools, comprising a supporting base provided with wheels, such that the stand may be easily moved about a job site wherein a plurality of pneumatic tools are employed, a vertical column removably supported on the base and extending thereabove, the column comprising a tube having two ends, the tube being closed at both ends, a male inlet air fitting on the tube such that the tube may be connected to a source of compressed air, and a plurality of female air outlet fittings on the tube near the top of the stand, such that the plurality of pneumatic tools may be easily and conveniently connected to the respective plurality of air outlet fittings, selectively, to the source of compressed air, a plurality of hooks secured to the tube and extending transversely therefrom for supporting one or more of the pneumatic tools when the tools are not in use, a tray circumferentially surrounding the tube and removably mounted on the tube intermediately thereof, such that persons on all sides of the stand have access to the tray, so that tool accessories, personal items or the like may be placed on the tray; and further wherein the tray includes an aperture formed therein for removably receiving the tube, an adjustment collar carried by the tray so as to be circumferentially disposed about the tube and a horizontal set screw carried by the collar for selectively securing the tray in a selected vertical position, such that the vertical positioning along the tube may be adjusted as desired and further such that the stand being easily and rapidly assembled and disassembled for transport between job sites.

14. A movable air stand for pneumatic tools, comprising a supporting base provided with wheels, such that the stand may be easily moved about a job site wherein a plurality of pneumatic tools are employed, a vertical column supported on the base and extending thereabove, the column comprising a tube having two ends, the tube being closed at both ends, a male inlet air fitting on the tube such that the tube may be connected to a source of compressed air, and a plurality of female air outlet fittings on the tube near the top of the stand, such that the plurality of pneumatic tools may be easily and conveniently connected to the respective plurality of air outlet fittings, selectively, to the source of compressed air, and a tray circumferentially surrounding the tube and mounted on the tube intermediately thereof, such that persons on all sides of the stand have access to the tray, so that tool accessories, personal items or the like may be placed on the tray, and further wherein the tray includes an aperture formed therein for removably receiving the tube, an adjustment collar carried by the tray so as to be circumferentially disposed about the tube and a horizontal set screw carried by the collar for selectively securing the tray in a selected vertical position, such that the vertical positioning along the tube may be adjusted as desired.

15. A disassembleable, movable air stand for pneumatic tools, comprising a supporting base provided with wheels, such that the stand may be easily moved about a job site wherein a plurality of pneumatic tools are employed, a vertical column removably supported on the base and extending thereabove, such that the stand may be easily and rapidly assembled and disassembled, the column comprising a tube having two ends, the tube being closed at both ends, a male inlet air fitting on the tube such that the tube may be connected to a source of compressed air, and a plurality of female air outlet fittings positioned diametrically opposite to each other on the tube near the top of the stand, such that the plurality of pneumatic tools may be easily and conveniently connected to the respective plurality of air outlet fittings, selectively, to the source of compressed air.

16. A movable air stand for pneumatic tools, comprising a portable supporting base, such that the stand may be easily moved about a job site wherein a plurality of pneumatic tools are employed, a vertical column supported on the base and extending thereabove, the column comprising a tube having two ends, the tube being closed at both ends, an air inlet fitting on the tube such that the tube may be connected to a source of compressed air, and a plurality of air outlet fittings on the tube, such that the plurality of pneumatic tools may be easily and conveniently connected to the respective plurality of air outlet fittings, selectively, to the source of compressed air, and a plurality of hooks secured to the tube and extending transversely therefrom for supporting one or more of the pneumatic tools when the tools are not in use, wherein the hooks are formed on respective hangers including a center member having a center opening formed therein and a rod that extends outwardly from opposite sides of the center member, whereby a pair of respective hooks are defined on each opposite end of the rod, and a plurality of fastening bolts disposed through the center opening of the center member and secured to the tube, such that each hanger having the pairs of hooks formed thereon may be selectively pivotally secured to the tube for pivotal movement in a vertical plane relative to the tube, whereby the hooks may be pivoted into a position being substantially parallel to the tube for reducing the possibility of damage thereto when moving the stand.

17. A movable air stand for pneumatic tools, comprising a portable supporting base, such that the stand may be easily moved about a job site wherein a plurality of pneumatic tools are employed, a vertical column supported on the base and extending thereabove, the column comprising a tube having two ends, the tube being closed at both ends, an air inlet fitting on the tube such that the tube may be connected to a source of compressed air, and a plurality of air outlet fittings on the tube, such that the plurality of pneumatic tools may be easily and conveniently connected to the respective plurality of air outlet fittings, selectively, to the source of compressed air, and a plurality of hooks secured to the tube and extending transversely therefrom for supporting one or more of the pneumatic tools when the tools are not in use, the hooks being selectively pivotally secured to the tube for pivotal movement in a vertical plane relative to the tube, whereby the hooks may be pivoted into a position being substantially parallel to the tube for reducing the possibility of damage thereto when moving the stand, wherein the hooks comprise a respective hanger for each of the pneumatic tools, each hanger having respective first and second opposite ends, the respective first ends of the hangers being pivotally joined to the tube for pivotal movement of the hanger about the first end thereof in a vertical plane, the respective second opposite ends of the hangers including a hook formed thereon for receiving and supporting one of the respective pneumatic tools that are not in use, and wherein the hooks are further comprised of a respective brace secured between the tube and each respective hanger, each brace having respective first and second opposite ends, the first ends of each brace being pivotally secured to the tube for pivotal movement of the brace about the first end thereof in a vertical plane and the second opposite ends of each brace being pivotally secured to the respective hangers between the first and second opposite ends of said respective hangers for concomitant pivotal movement of the brace and the hanger in a vertical plane, and the tube of the vertical column further including a respective vertical guideway for each of the respective hangers for receiving therein the respective first ends of the braces, such that the first ends of the braces may be vertically moved along the tube for permitting vertical pivoting of the respective braces and hangers.

18. A movable air stand for pneumatic tools, comprising a portable supporting base, such that the stand may be easily moved about a job site wherein a plurality of pneumatic tools are employed, a vertical column supported on the base and extending thereabove, the column comprising a tube having two ends, the tube being closed at both ends, an air inlet fitting on the tube such that the tube may be connected to a source of compressed air, and a plurality of air outlet fittings on the tube, such that the plurality of pneumatic tools may be easily and conveniently connected to the respective plurality of air outlet fittings, selectively, to the source of compressed air, and a plurality of hooks secured to the tube and extending transversely therefrom for supporting one or more of the pneumatic tools when the tools are not in use, the hooks being selectively pivotally secured to the tube for pivotal movement in a vertical plane relative to the tube, whereby the hooks may be pivoted into a position being substantially parallel to the tube for reducing the possibility of damage thereto when moving the stand, wherein the hooks comprise a respective hanger for each of the pneumatic tools each hanger having a center member, each center member having a pair of opposite sides and a center opening through each center member, the center opening being substantially parallel to the respective sides thereof; a rod extending outwardly from each side of the center member; a plurality of spaced-apart threaded means connected to the tube, each threaded means extending outwardly from the tube such that the center opening of each respective center member may receive a respective threaded means therein such that the respective hanger may pivot about the respective threaded means; and a plurality of threaded fasteners cooperating with the respective threaded means such that the respective threaded fastener may secure the respective hanger thereto with the respective rods being transverse with respect to the tube and being in a vertical plane with respect to the tube.

19. In an air stand for pneumatic tools of the type having a supporting base, a vertical column supported on the base and extending thereabove, the column including a tube having two ends, the tube being closed at both ends, an air inlet on the tube such that the tube may be connected to a source of compressed air, and a plurality of air outlets on the tube, such that the plurality of pneumatic tools may be connected to the respective plurality of air outlets, selectively, to the source of compressed air, the improvement thereupon comprising: the base being a portable base, such that the stand may be easily moved about a job site wherein a plurality of pneumatic tools are employed and means on the stand for supporting one or more of the pneumatic tools when the tools are not in use, and wherein the vertical column is removably supported on the base, such that the stand may be easily and rapidly assembled and disassembled.

20. The improvement of claim 19, wherein the portable base includes à base plate provided with wheels.

21. The improvement of claim 19, wherein the means on the stand for supporting one or more of the pneumatic tools when the tools are not in use includes a respective hanger for each of the pneumatic tools, each hanger having respective first and second opposite ends, the respective first ends of the hangers being pivotally joined to the tube for pivotal movement of the hanger about the first end thereof in a vertical plane, the respective second opposite ends of the hangers including a hook formed thereon for receiving and supporting one of the respective pneumatic tools that are not in use.

22. In an air stand for pneumatic tools of the type having a supporting base, a vertical column supported on the base and extending thereabove, the column including a tube having two ends, the tube being closed at both ends, an air inlet on the tube such that the tube may be connected to a source of compressed air, and a plurality of air outlets on the tube, such that the plurality of pneumatic tools may be connected to the respective plurality of air outlets, selectively, to the source of compressed air, the improvement thereupon comprising: the base being a portable base, such that the stand may be easily moved about a job site wherein a plurality of pneumatic tools are employed and means on the stand for supporting one or more of the pneumatic tools when the tools are not in use, and wherein the hooks are further comprised of a respective brace secured between the tube and each respective hanger, each brace having respective first and second opposite ends, the first ends of each brace being pivotally secured to the tube for pivotal movement of the brace about the first end thereof in a vertical plane and the second opposite ends of each brace being pivotally secured to the respective hangers between the first and second opposite ends of said respective hangers for concomitant pivotal movement of the brace and the hanger in a vertical plane, and the tube of the vertical column further including a respective vertical guideway for each of the respective hangers for receiving therein the respective first ends of the braces, such that the first ends of the braces may be vertically moved along the tube for permitting vertical pivoting of the respective braces and hangers.

23. In an air stand for pneumatic tools of the type having a supporting base, a vertical column supported on the base and extending thereabove, the column including a tube having two ends, the tube being closed at both ends, an air inlet on the tube such that the tube may be connected to a source of compressed air, and a plurality of air outlets on the tube, such that the plurality of pneumatic tools may be connected to the respective plurality of air outlets, selectively, to the source of compressed air, the improvement thereupon comprising: the base being a portable base, such that the stand may be easily moved about a job site wherein a plurality of pneumatic tools are employed and means on the stand for supporting one or more of the pneumatic tools when the tools are not in use, and wherein the means on the stand for supporting one or more of the pneumatic tools when the tools are not in use includes a respective hanger for each of the pneumatic tools, each hanger having a center member, each center member having a pair of opposite sides and a center opening through each center member, the center opening being substantially parallel to the respective sides thereof; a rod extending outwardly from each side of the center member; a plurality of spaced-apart threaded means connected to the tube, each threaded means extending outwardly from the tube such that the center opening of each respective center member may receive a respective threaded means therein such that the respective hanger may pivot about the respective threaded means, and a plurality of threaded fasteners cooperating with the respective threaded means such that the respective threaded fastener may secure the respective hanger thereto with the respective rods being transverse with respect to the tube and being in a vertical plane with respect to the tube.

24. A movable air stand for pneumatic tools, comprising a supporting base provided with wheel means, such that the stand may be easily moved by a user about a surface of a job site, wherein a plurality of pneumatic tools are employed, a vertical column removably supported on the base and extending thereabove, wherein the user may grasp the column and easily move the air stand; the column comprising a pipe, the pipe having a top end and a bottom end, the pipe being closed at both ends, a male inlet air fitting on the pipe near the supporting base such that the pipe may be connected to a source of compressed air, and a plurality of female air outlet fittings on the pipe, such that the plurality of pneumatic tools may be easily and conveniently connected to the respective plurality of air outlet fittings, selectively, to the source of compressed air; a plurality of supporting means secured to the pipe and extending transversely therefrom for supporting one or more of the pneumatic tools when the tools are not in use, a tray circumferentially surrounding the pipe, said tray being removably and adjustably mounted on the pipe intermediately thereof, such that persons on all sides of the stand have access to the tray, so that tool accessories, personal items or the like may be placed on the tray; wherein at least a first air outlet fitting is disposed at a first height above the surface of the job site and the tray may be adjusted to a position near the at least first air outlet fitting such that the user may rock conveniently at the first height and wherein at least a second air outlet fitting is disposed at a second height above the surface of the job site and the tray may be adjusted to a position near the at least second air outlet fitting such that the user may work conveniently at the second height, the first height being elevated above the second height; and the stand being easily and rapidly assembled and disassembled for transport between the job sites.

25. A disassembleable movable air stand for use with a plurality of pneumatic tools driven by a source of compressed air on a job site, comprising a supporting base provided with wheel means, a vertical pipe removably mounted on the base and extending thereabove, such that the stand may be easily and rapidly assembled and disassembled, and further such that the user may conveniently grasp the pipe for moving the stand around the job site, the pipe having top and bottom portions provided with closure means, an inlet fitting on the pipe near the base, such that the pipe may be connected to the source of compressed air, at least two outlet fittings on the pipe including a first outlet fitting at a first level above the base and further including a second outlet fitting at a second and higher level above the base, such that the first outlet fitting may be coupled to a pneumatic tool used by a first worker on the job site, and such that the second outlet fitting may be coupled to another pneumatic tool used by a second worker on a ladder or otherwise on a higher elevation than the first worker, and hook means on the pipe for supporting the first and second pneumatic tools when not in use.

26. A disassembleable movable air stand for use with a plurality of pneumatic tools driven by a source of compressed air on a job site, comprising a supporting base provided with wheel means, a vertical pipe removably mounted on the base and extending thereabove, such that the stand may be easily and rapidly assembled and disassembled, and further such that the user may conveniently grasp the pipe for moving the stand around the job site, the pipe having top and bottom portions provided with closure means, an inlet fitting on the pipe near the base, such that the pipe may be connected to the source of compressed air, at least two outlet fittings on the pipe including a first outlet fitting at a first level above the base and further including a second outlet fitting at a second and higher level above the base, such that the first outlet fitting may be coupled to a pneumatic tool used by a first worker on the job site, and such that the second outlet fitting may be coupled to another pneumatic tool used by a second worker on a ladder or otherwise on a higher elevation than the first worker, first means on the pipe and adjacent to the first outlet fitting for supporting the first pneumatic tool when not in use, and second means on the pipe and adjacent to the second outlet fitting for supporting the second pneumatic tool when not in use.

* * * * *